US010616768B2

(12) United States Patent
Bull

(10) Patent No.: US 10,616,768 B2
(45) Date of Patent: Apr. 7, 2020

(54) WIRELESS COMMUNICATION WITH INTERFERENCE MITIGATION

(71) Applicant: Iridium Satellite LLC, McLean, VA (US)

(72) Inventor: Jeffrey Bull, Chalfont, PA (US)

(73) Assignee: Iridium Satellite LLC, McLean, VA (US)

( * ) Notice: Subject to any disclaimer, the term of this patent is extended or adjusted under 35 U.S.C. 154(b) by 187 days.

(21) Appl. No.: 15/613,770

(22) Filed: Jun. 5, 2017

(65) Prior Publication Data

US 2017/0353864 A1 Dec. 7, 2017

Related U.S. Application Data

(60) Provisional application No. 62/345,859, filed on Jun. 5, 2016.

(51) Int. Cl.

| | |
|---|---|
| *H04B 1/10* | (2006.01) |
| *H04W 16/04* | (2009.01) |
| *H04W 16/14* | (2009.01) |
| *H04W 72/08* | (2009.01) |
| *H04W 16/10* | (2009.01) |
| *H04B 7/212* | (2006.01) |

(Continued)

(52) U.S. Cl.
CPC ............ *H04W 16/04* (2013.01); *H04B 1/10* (2013.01); *H04B 7/212* (2013.01); *H04L 5/023* (2013.01); *H04L 27/2608* (2013.01); *H04W 16/10* (2013.01); *H04W 16/14* (2013.01); *H04W 72/08* (2013.01); *H04L 5/0023* (2013.01)

(58) Field of Classification Search
None
See application file for complete search history.

(56) References Cited

U.S. PATENT DOCUMENTS

| | | | | |
|---|---|---|---|---|
| 2002/0072344 A1* | 6/2002 | Souissi | .................. | H04B 1/123 455/296 |
| 2004/0192293 A1* | 9/2004 | Karabinis | .......... | H04B 7/18543 455/427 |

(Continued)

FOREIGN PATENT DOCUMENTS

WO WO-2011082484 A1 * 7/2011 ............. H04B 1/109

*Primary Examiner* — Alejandro Rivero
(74) *Attorney, Agent, or Firm* — Baker Botts L.L.P.

(57) ABSTRACT

In one implementation, a wireless communication terminal includes a sense antenna module configured to sample an interference signal. The wireless communication terminal also includes a primary antenna module configured to receive a desired signal. The sense antenna module has a first polarization type, and the primary antenna module has a second polarization type, substantially orthogonal to the first polarization type of the sense antenna module. In addition, the wireless communication terminal includes at least one signal combiner configured to receive output from the sense antenna module and output from the primary antenna module. The at least one signal combiner is configured to mitigate interference with the desired signal by shifting the phase of the output from the sense antenna module by substantially 180 degrees and combining the phase-shifted output from the sense antenna module with the output of the primary antenna module to produce an interference mitigated signal.

20 Claims, 13 Drawing Sheets

(51) Int. Cl.
*H04L 27/26* (2006.01)
*H04L 5/02* (2006.01)
*H04L 5/00* (2006.01)

(56) References Cited

U.S. PATENT DOCUMENTS

2006/0128336 A1* 6/2006 Waltman ................ H01Q 19/17
                                                    455/273
2007/0098121 A1* 5/2007 Casabona .......... H04B 7/18513
                                                    375/346
2016/0337047 A1* 11/2016 Khoshnevisan ..... H04B 17/318

* cited by examiner

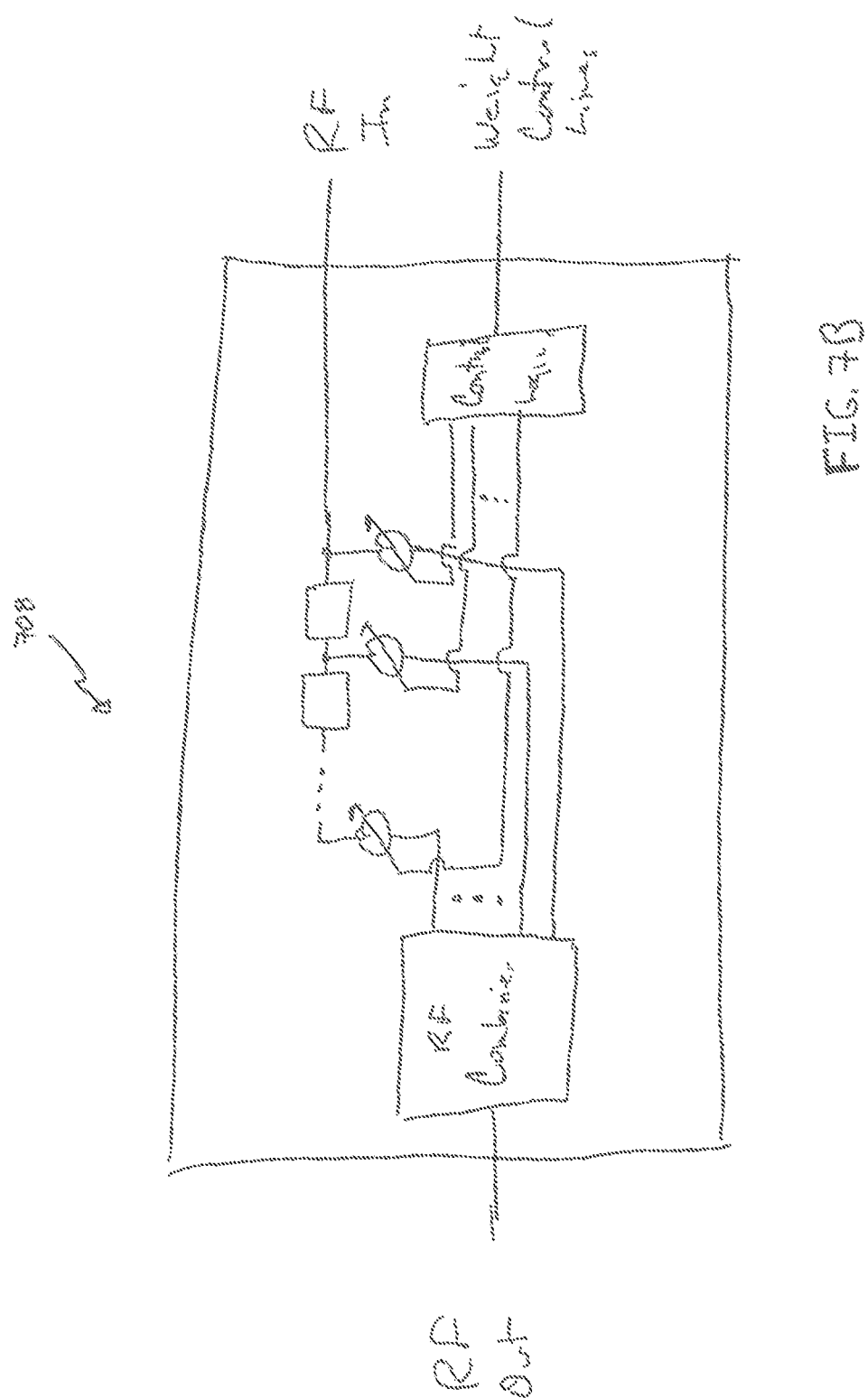

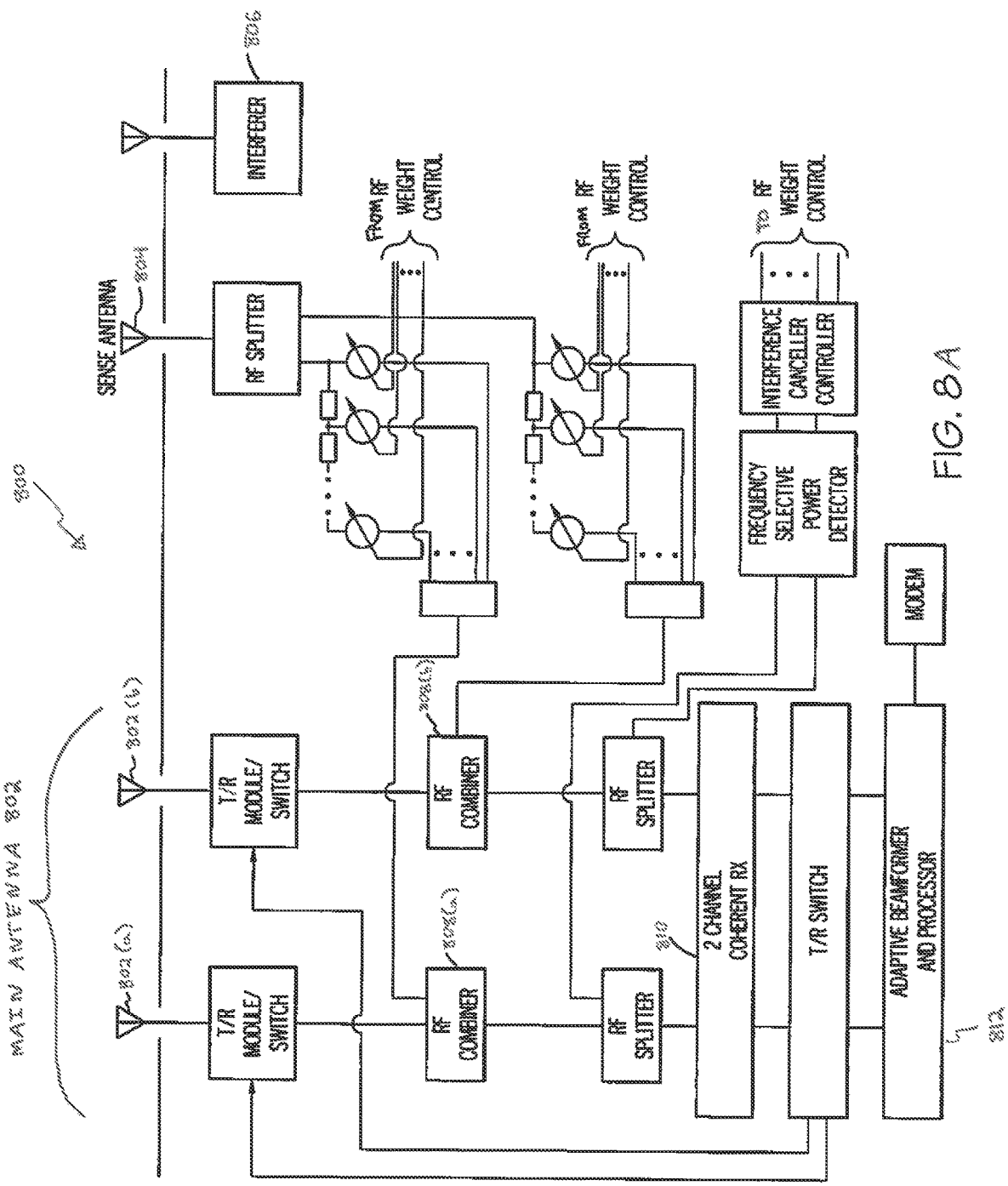

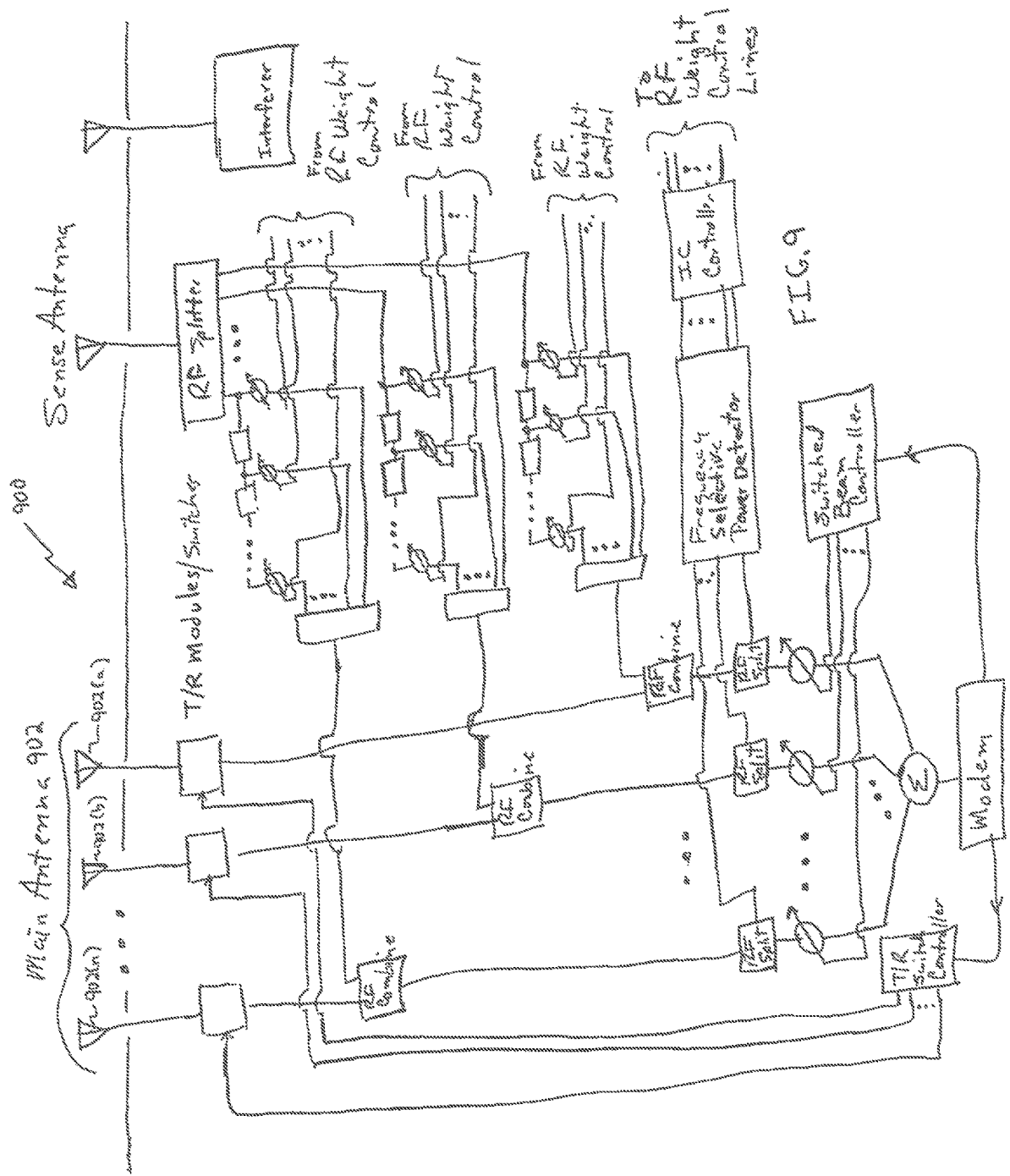

WIRELESS COMMUNICATION WITH INTERFERENCE MITIGATION

CROSS-REFERENCE TO RELATED APPLICATION

This application claims the benefit of U.S. Provisional Patent Application No. 62/345,859 filed on Jun. 5, 2016, the disclosure of which is incorporated herein by reference in its entirety.

TECHNICAL FIELD

The disclosure relates generally to wireless communication, and more specifically to wireless communication with interference mitigation.

SUMMARY

According to one implementation of the disclosure, a wireless communication terminal includes a sense antenna module configured to sample an interference signal from a co-located interfering communication system terminal. The wireless communication terminal also includes a primary antenna module configured to receive a desired signal. The sense antenna module has a first polarization type, and the primary antenna module has a second polarization type, substantially orthogonal to the first polarization type of the sense antenna module. In addition, the wireless communication terminal includes at least one signal combiner configured to receive output from the sense antenna module and output from the primary antenna module. The at least one signal combiner is configured to mitigate interference with the desired signal by shifting the phase of the output from the sense antenna module by substantially 180 degrees and combining the phase-shifted output from the sense antenna module with the output of the primary antenna module to produce an interference mitigated signal.

Other features of the present disclosure will be apparent in view of the following detailed description of the disclosure and the accompanying drawings. Implementations described herein, including the above-described implementations, may include a method or process, a system, or computer-readable program code embodied on computer-readable media.

BRIEF DESCRIPTION OF THE DRAWINGS

For a more complete understanding of the present disclosure, reference now is made to the following description taken in connection with the accompany drawings.

FIGS. 1, 3A, 3B, 5, 6A, 6B, 7A, 8A, 8B, and 9 are block diagrams of systems for wireless communication with interference mitigation using a sense antenna in accordance with non-limiting implementations of the present disclosure.

FIG. 7B is a block diagram of an adaptive transversal filter in accordance with a non-limiting implementation of the present disclosure.

DETAILED DESCRIPTION

Figure 1:
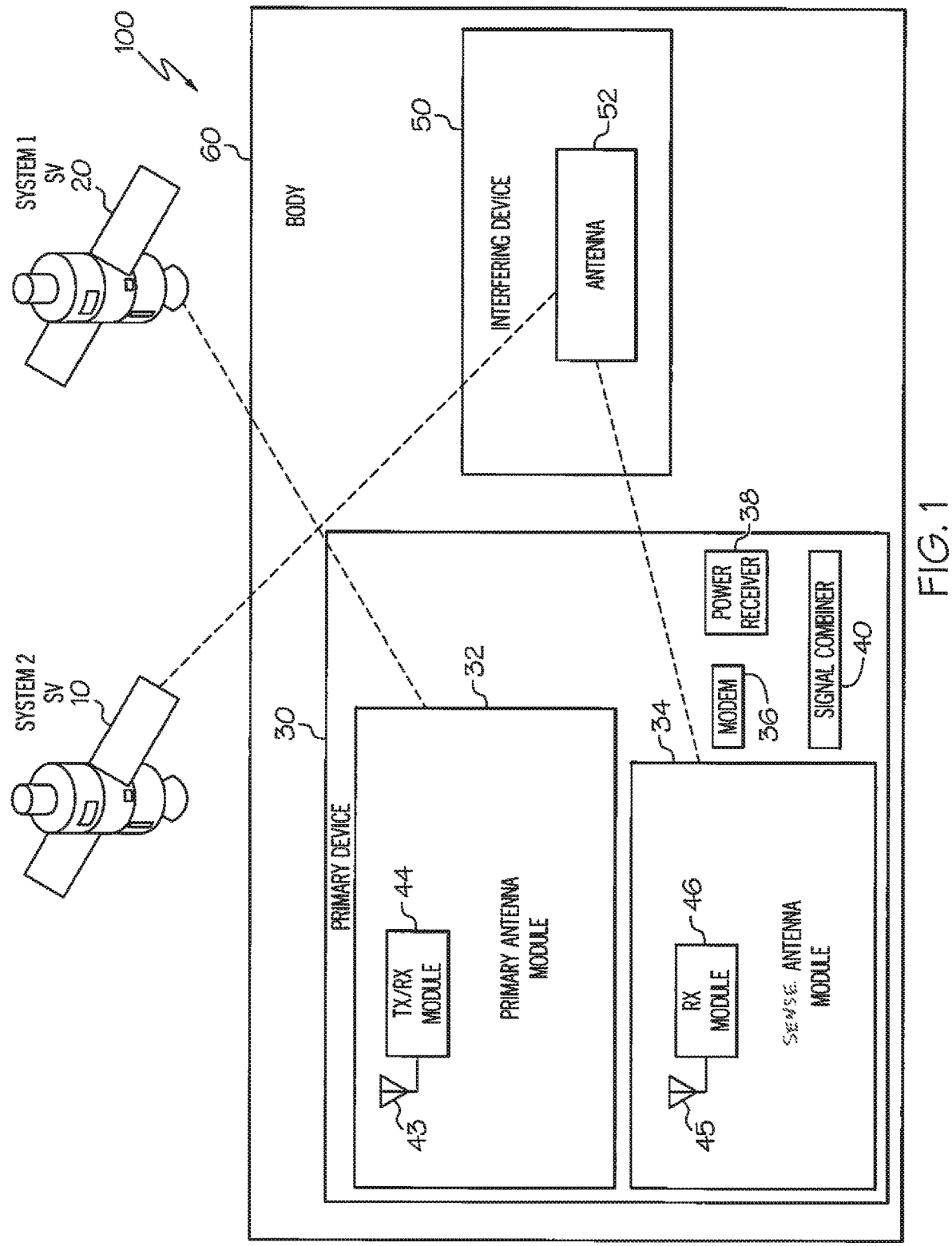

Satellite communication systems enable wireless voice and data communications around the world. In some cases, satellite communication systems enable communication in regions where other wireless communication systems may not be available. For example, some wireless communication systems may require terrestrial infrastructure (e.g., a cell tower, a base station, etc.). It may not be possible to communicate using these systems in regions where the necessary terrestrial infrastructure does not exist or cannot be accessed. However, satellite communication systems still may be capable of communicating in such regions. Examples of these regions include the oceans, the airways, the Polar Regions, and developing and/or underdeveloped nations.

Frequently, multiple satellite communication systems may be co-located (e.g., within a fixed relative area). For example, an aircraft equipped with two or more satellite communication systems may have only a small area on the fuselage suitable for installing the antennae for the satellite communication systems and, consequently, the antennae for the satellite communication systems may be forced to be installed in close physical proximity to one another (e.g., within a few feet or yards of one another on the fuselage). Similarly, a ship equipped with two or more satellite communication systems may have limited external area suitable for mounting the antennae for the satellite communications systems. As a result, the antennae for the satellite communication systems may be mounted in close physical proximity to one another.

In some cases, two or more co-located satellite communication systems may use similar, adjacent, neighboring, and/or overlapping frequencies (e.g., for transmit and/or receive functions of satellite communication). As a result, an output signal transmitted by a first satellite communication system may interfere with the ability of a second, co-located satellite communication system to receive an input signal, and vice versa, particularly if the power of the interfering output signal is significantly greater than the power of the desired input signal.

For example, if the first satellite communication system transmits a relatively high-power output signal in a frequency band that is immediately adjacent to the frequency band in which the second satellite communication system receives a relatively low-power input signal, components of the relatively high-power output signal may spill over into the frequency band in which the second satellite communication system receives the low-power input signal and, particularly due to the power difference between the two signals, cause interference with the relatively low-power input signal, thereby degrading the performance of the second satellite communication system. Additionally or alternatively, the presence of the relatively high-power output signal may cause reciprocal mixing in the receiver(s) of the second satellite communication system also resulting in degradation of the second satellite communication system's ability to receive the relatively low-power input signal. Further, interfering signal splatter, or switch noise, that results from abrupt changes in signal transmission in neighboring frequency bands by the first satellite communication system may cast spurious emissions further into the second satellite communication system's desired frequency band, further complicating noise attenuation and filtering processes.

One interference mitigation technique to address the above-noted issues involves using relatively large, physical, front-end filters to attenuate interfering signal noise. However, even filters of the required physical size may not be capable of sufficiently attenuating interfering signals transmitting in immediately adjacent frequency bands. Additionally, filters alone may be ineffective at reducing signal splatter in the receiver's desired frequency band.

In certain implementations of the present disclosure, interference experienced by a susceptible communication system due to a co-located interfering communication system is mitigated using a dedicated sense antenna. The sense antenna is configured to sample transmissions from the interfering communication system. A phase shift or other function then may be applied to output from the sense antenna. For example, output from the sense antenna may be combined in antiphase with (or subtracted from) the signal received by the susceptible communication system to remove the interfering signal noise from the desired signal. Thus, interfering signal noise can be canceled from the desired signal without any direct connection to the interfering system. In other words, interfering signal noise is received wirelessly via a sense antenna and processed along with the desired signal to remove noise and interference characteristics in the desired signal.

However, use of a sense antenna in this manner may pose some challenges. For example, subtracting the signal sampled by the sense antenna from the primary signal may impact the spatial response of the susceptible system's primary antenna, particularly in the direction of the interfering system and/or sense antenna, potentially creating a spatial hole in the primary antenna's coverage. While a high gain, directional sense antenna may limit the extent of this gap in the spatial response, such antennas nevertheless may be relatively large physically, which may be undesirable in certain situations (e.g., when mounted on an aircraft).

In certain implementations of the present disclosure, the electromagnetic polarization response of the sense antenna may be configured to be substantially orthogonal to the electromagnetic polarization response of the primary antenna, which itself may be configured to be responsive to the polarization of the desired signal. In such implementations, as described in greater detail below, the primary antenna and the sense antenna may exhibit similar responses to the interfering signal, while the sense antenna, nevertheless, may be relatively unresponsive to the desired signal due to its orthogonal polarization response. Consequently, subtracting or otherwise combining output from the sense antenna with output from the primary antenna may not have a significant, negative impact on the spatial response of the susceptible system while still achieving satisfactory interference mitigation.

To understand this further, consider the following. At a conducting boundary or interface, the horizontal components of the electric field of an electromagnetic signal in the horizon plane substantially cancel each other while the vertical components of the electric field of the electromagnetic signal substantially reinforce each other. Consequently, in the horizon plane, antennas mounted to a conducting boundary like the metal fuselage of an aircraft or the deck of a ship may be primarily responsive to the vertical components of the electric field of an electromagnetic signal (e.g., which reinforce) and relatively unresponsive to the horizontal components of the electric field of the electromagnetic signal (e.g., which cancel). Meanwhile, outside of the horizon plane, the responses of such antennas to electromagnetic signals may be functions of their polarization responses. For similar reasons, in the horizon plane, an electromagnetic signal transmitted by an antenna mounted to a conducting boundary may exhibit vertical polarization and relatively little or no horizontal polarization.

As such, two antennas that have substantially orthogonal polarization responses and that are mounted to a conducting boundary like the fuselage of an aircraft or the deck of a ship may have substantially similar responses to an electromagnetic signal in the horizon plane (such as, for example, an interfering signal that is transmitted by another antenna or other source similarly mounted to the conducting boundary) but substantially orthogonal polarization responses outside of the horizon plane. By taking advantage of this phenomenon, a primary antenna and a sense antenna that have orthogonal polarization responses may have substantially similar responses to an interfering signal (in the horizon plane), but, outside of the horizon plane, the sense antenna may be relatively unresponsive to the desired signal due to the polarization response of the sense antenna being orthogonal to the polarization of the designed signal.

For example, in certain implementations, the sense antenna may be configured to be left hand circularly polarized ("LHCP") while the primary antenna may be configured to be right hand circularly polarized ("RHCP") (e.g., if the desired signal is a RHCP signal). In such an implementation, both the primary and sense antennas may be responsive to the interfering signal (e.g., because the interfering signal may be in the horizon plane), but the LHCP sense antenna may be relatively unresponsive to the RHCP desired signal (which, for example, may be outside of the horizon plane).

The teachings of the present disclosure describe several techniques for interference mitigation (e.g., in the context of co-located satellite terminals) by sampling an interfering signal using a sense antenna. In certain implementations, the interference mitigation processing may be performed at digital baseband. In such implementations, both the signal received by the primary antenna and the signal received by the sense antenna may be converted to digital baseband before the interference mitigation is performed. However, performing the interference mitigation at digital baseband in this manner may benefit from high intercept point receivers, which may be more expensive than other receivers. Therefore, in other implementations, the interference mitigation processing may be performed at radio frequency ("RF"). In still other implementations, a hybrid RF and digital baseband approach to interference mitigation may be performed.

In one specific example, an IRIDIUM® satellite terminal that uses L-band frequencies, for example, between 1616 and 1626.5 megahertz ("MHz"), to communicate with IRIDIUM® satellites may be co-located (e.g., on a ship or aircraft) with an INMARSAT® satellite terminal that uses L-band frequencies, for example, between 1525 and 1646.5 MHz, to communicate with one or more INMARSAT® satellites. Consequently, transmissions from the INMARSAT® satellite terminal may pose the potential for interfering with the ability of the IRIDIUM® satellite terminal to receive desired signals. For example, the INMARSAT® satellite terminal may transmit communications in a frequency band that is adjacent to a frequency band in which the IRIDIUM® satellite terminal receives transmissions from IRIDIUM® satellites. Accordingly, outbound transmissions from the INMARSAT® satellite terminal may pose the potential to interfere with transmissions received by the IRIDIUM® satellite terminal and/or cause signal splatter in the IRIDIUM® satellite terminal frequency band resulting in signal degradation, particularly given the relatively high power of output transmissions from the INMARSAT® satellite terminal required to reach an INMARSAT® satellite and the relatively low power of transmissions received by the IRIDIUM® satellite terminal from an IRIDIUM® satellite. For example, the power ratio of transmissions output by the INMARSAT® satellite terminal to transmissions received by the IRIDIUM® satellite terminal may be on the order of +100 dB or more.

A satellite communication terminal may be configured to mitigate the effects of interference from one or more other satellite communication terminals in the event that the satellite communication terminal is co-located with one or more other satellite communications terminals that use, for example, similar, adjacent, neighboring, and/or overlapping frequencies. For instance, a satellite communication terminal configured to receive a signal from one or more satellites even when co-located with another satellite communication terminal that transmits an output signal in a similar, adjacent, neighboring, and/or overlapping frequency band may employ beam steering (e.g., using complex weights, phase shifters, etc.) to steer the main beam of the satellite communication terminal's antenna toward the signal to be received (and, in some cases away from the interfering signal output by the co-located satellite communication terminal). However, in some cases (e.g., if the power of the interfering signal is significantly greater than the power of the signal to be received), such beam steering alone may not effectively mitigate the interference caused by the signal transmitted by the co-located satellite communication terminal.

Additionally or alternatively, the satellite communication terminal may employ frequency domain filtering techniques (e.g., band pass filtering, for instance, using a surface acoustic wave ("SAW") filter) to mitigate interference caused by the signal transmitted by the co-located satellite communication terminal. However, in some cases (e.g., if the interfering signal is in a similar, adjacent, neighboring, and/or overlapping frequency band and particularly if the power of the interfering signal is significantly greater than the power of the signal to be received), such frequency domain filtering techniques alone may not effectively mitigate the interference caused by the signal transmitted by the co-located satellite communication terminal.

As described herein, implementations of the present disclosure may provide a satellite communication system configured to mitigate the effects of interference from one or more other co-located satellite communication systems. For example, implementations of the present disclosure may utilize a combination of a main antenna or antenna array and a sense antenna to sample an interfering signal from a co-located satellite (or other) communication system and subtract the interfering signal from the signal received by the main antenna to mitigate the interference caused by the interfering signal to the desired signal.

With reference to FIG. 1, a high-level block diagram of a system 100 for wireless communication is illustrated in accordance with a non-limiting implementation of the present disclosure. System 100 includes satellite vehicles ("satellite" or "SV") 10 and 20, wireless communication terminal 30 for transmitting and/or receiving signals to/from satellite 20, and interfering wireless communication terminal 50 for transmitting and/or receiving signals to/from satellite 10. Wireless communication terminal 30 includes a primary antenna module 32, a sense antenna module 34, a modem 36, a power receiver 38, and a signal combiner 40.

In particular implementations, terminal 30 includes additional modules and equipment, such as a Beam Steering Controller ("BSC"), an Interference Canceller Controller ("ICC"), and an adaptive beamformer/processor, as necessary for implementation of the described or additional functionality. Alternatively, in other implementations, one or more of a BSC, an ICC, and an adaptive beamformer/processor may be integrated within the modules illustrated in wireless communication terminal 50. For example, in some implementations, an adaptive beamformer/processor may be integrated within signal combiner 40 or signal combiner 40 may be implemented as an adaptive beamformer/processor. In certain implementations, primary antenna module 32 has one or more antenna elements 43 (e.g., a single antenna element or an antenna array), each of which includes a corresponding transmit/receive ("TX/RX") module 44. Sense antenna module 34 can also be configured with one or more antenna elements 45, each of which includes a corresponding receive ("RX") module 46. For example, primary antenna module 32 may have 12 antenna elements, and sense antenna module 34 may have 3 antenna elements. Primary antenna module 32 may transmit and/or receive signals from/to satellite 20.

Interfering wireless communication terminal 50 includes one or more antenna elements 52 transmitting and/or receiving electromagnetic signals to/from other communication terminals, such as communication terminals on board satellite 10. In certain implementations, interfering terminal 50 transmits high power signals using frequencies that neighbor and/or overlap with the frequencies primary terminal 30 uses to transmit and/or receive electromagnetic signals to/from satellite 20. For example, primary terminal 30 may receive electromagnetic signals from satellite 20 in a first frequency band that is directly adjacent (or nearly adjacent) to a second frequency band that terminal 50 uses to transmit electromagnetic signals to satellite 10.

When interfering wireless communication terminal 50 is transmitting to satellite 10, antenna 52 may send a relatively high power transmission signal (relative to the power of the signal that wireless communication terminal 30 receives from satellite 20) from interfering wireless communication terminal 50 to satellite 10. The relatively high power transmission signal sent by interfering wireless communication terminal 50 may be in a similar, adjacent, neighboring and/or overlapping frequency band to the frequency band in which wireless communication terminal 30 is configured to receive signals from satellite 20.

Furthermore, wireless communication terminal 30 may be located in close proximity (e.g., less than 5 feet, between 5 and 15 feet, between 15-50 feet, etc.) to interfering wireless communication terminal 50. Thus, the relatively high power transmission signal sent by interfering wireless communication terminal 50 may interfere with the ability of wireless communication terminal 30 to receive the relatively low power signal from satellite 20. In some implementations, wireless communication terminal 30 and wireless communication terminal 50 may be co-located on the fuselage of an aircraft, the deck of a ship, or the exterior of some other type of vehicle. Additionally or alternatively, in some implementations, wireless communication terminal 30 may be positioned (or otherwise configured) such that wireless communication terminal 50 (and/or signals transmitted by antenna 52) are substantially in the horizon plane of wireless communication terminal 30 (and/or antenna modules 32 and 34).

In some implementations, an adaptive beamformer or processor may be configured to steer a main beam of primary antenna module 32 in a desired direction to facilitate the transmission of signals to and/or the reception of signals from satellite 20. However, even with a main beam of primary antenna module 32 positioned to facilitate the reception of the signal from satellite 20, the signal transmitted by interfering wireless communication terminal 50 still may interfere with the ability of wireless communication terminal 30 to receive the signal from satellite 20.

Therefore, sense antenna module 34 may be used to sample the signal transmitted by interfering wireless communication terminal 50, and the sampled interfering signal may be subtracted from (e.g., combined in antiphase with) the signal received by primary antenna module 32 using signal combiner 40 to produce an interference mitigated signal that thereafter is provided to modem 36 where the desired signal is demodulated. In some implementations, sense antenna module 34 may be steered in an attempt to concentrate a main beam of sense antenna module 34 on receiving signals transmitted by wireless communication terminal 50.

As described above, in some implementations, wireless communication terminal 30 and wireless communication terminal 50 may be mounted on or otherwise located near a conductive boundary, such as, for example, the fuselage of an aircraft or the deck of a ship, and the polarization response of primary antenna module 32 may be configured to be orthogonal to the polarization response of sense antenna module 34. For example, in some such implementations, the desired signal transmitted by satellite 20 and correspondingly the primary antenna module 32 may be configured to be right hand circularly polarized ("RHCP"), while the sense antenna module 34 may be configured to be left hand circularly polarized ("LHCP"). In such implementations, in the horizon plane (e.g., where interfering wireless communication terminal 50 may be located), the sense antenna module 34 may respond primarily to the vertically polarized components of the interfering signal (e.g., because vertically polarized fields reinforce at the conducting boundary of an aircraft fuselage, a ship deck, or the like while horizontally polarized fields cancel at such conducting boundaries). Meanwhile, because of the location of the interfering terminal 50 on or near the surface of the conducting boundary, the interfering signal, at least in the horizon plane at sense antenna module 34, may be primarily vertically polarized. As such, sense antenna module 34 may be responsive to the interfering signal transmitted by wireless communication terminal 50 but relatively unresponsive to the desired signal transmitted by satellite 20 (e.g., because of the polarization response of sense antenna module 34 being orthogonal to the polarization of the desired signal (and correspondingly the polarization of the primary antenna module 32)) outside of the horizon plane.

Figure 2:
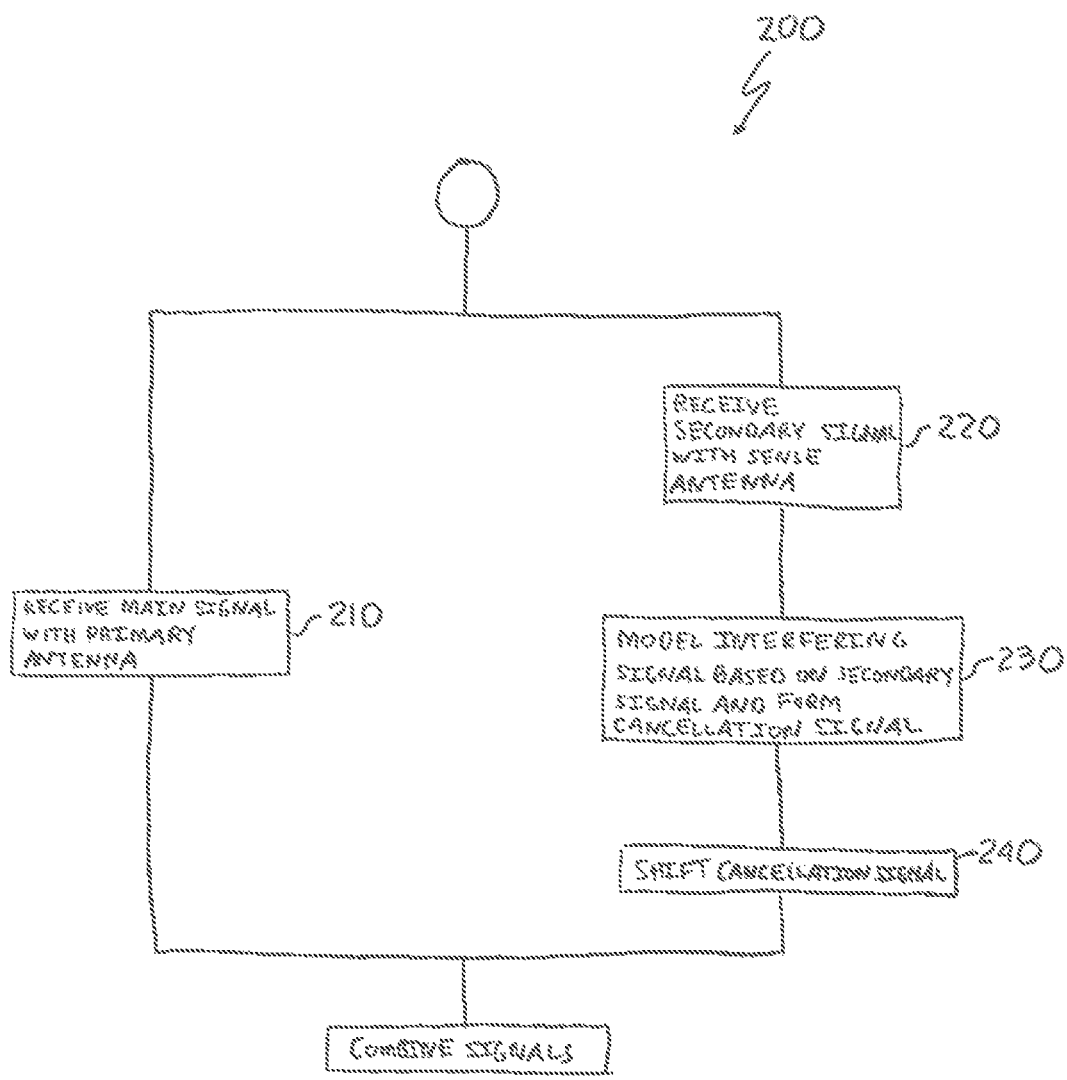
FIG. 2 is a flow chart of a method for wireless communication with interference mitigation using a sense antenna in accordance with a non-limiting implementation of the present disclosure.

With reference to FIG. 2, a flow chart 200 of a method for wireless communication that mitigates interference caused by an interfering signal transmitted by a co-located wireless communication terminal is illustrated in accordance with a non-limiting implementation of the present disclosure. The method illustrated in flow chart 200 may be performed, for example, by the wireless communication terminals 30, 300, 400, 500, 600, 650, 700, 800, 850, and 900 illustrated in FIGS. 1, 3A, 3B, 5, 6A, 6B, 7A, 8A, 8B, and 9, respectively. At step 210, a main signal is received using a primary antenna. In some implementations, the primary antenna may be configured to have a polarization response that corresponds to the polarization of a desired signal. Additionally or alternatively, in some implementations, the primary antenna may be an adaptive antenna. In such implementations, a main beam of the primary antenna may be steered to a desired direction for receiving the desired signal. For example, the desired signal to be received may be transmitted by a satellite orbiting the earth, and a main beam of the primary antenna may be steered in a direction favorable for receiving the desired signal. In some such implementations, the main beam of the primary antenna may be steered in the desired direction by defining and applying complex weights to the signals received by individual antenna elements of the primary antenna.

At step 220, for example, in parallel or simultaneous with step 210, a secondary signal is sampled using a sense antenna. In some implementations, the sense antenna may be configured to have a polarization response that is substantially orthogonal to the polarization response of the primary antenna and the corresponding polarization of the desired signal. In such implementations, the sense antenna may be responsive to the interfering signal transmitted by the co-located wireless communication terminal but relatively unresponsive to the orthogonally polarized, desired signal.

At step 230, the interfering signal transmitted by the co-located wireless communication terminal is modeled based on the secondary signal received by the sense antenna to form a cancellation signal. In some implementations, distortions and other effects attributable to the interfering signal transmitted by the co-located wireless communication terminal can be modeled as part of modeling the interfering signal.

At step 240, the phase of the cancellation signal is shifted (e.g., by substantially 180°) so that, when combined with the main signal, the model of the interfering signal effectively is subtracted from the main signal. At step 250, the phase-shifted cancellation signal is combined with the main signal to produce an interference mitigated signal.

In particular implementations, the cancellation signal and the main signal are combined in the digital baseband domain. In other implementations, the cancellation signal and the main signal may be combined in the RF domain.

Figure 3A:
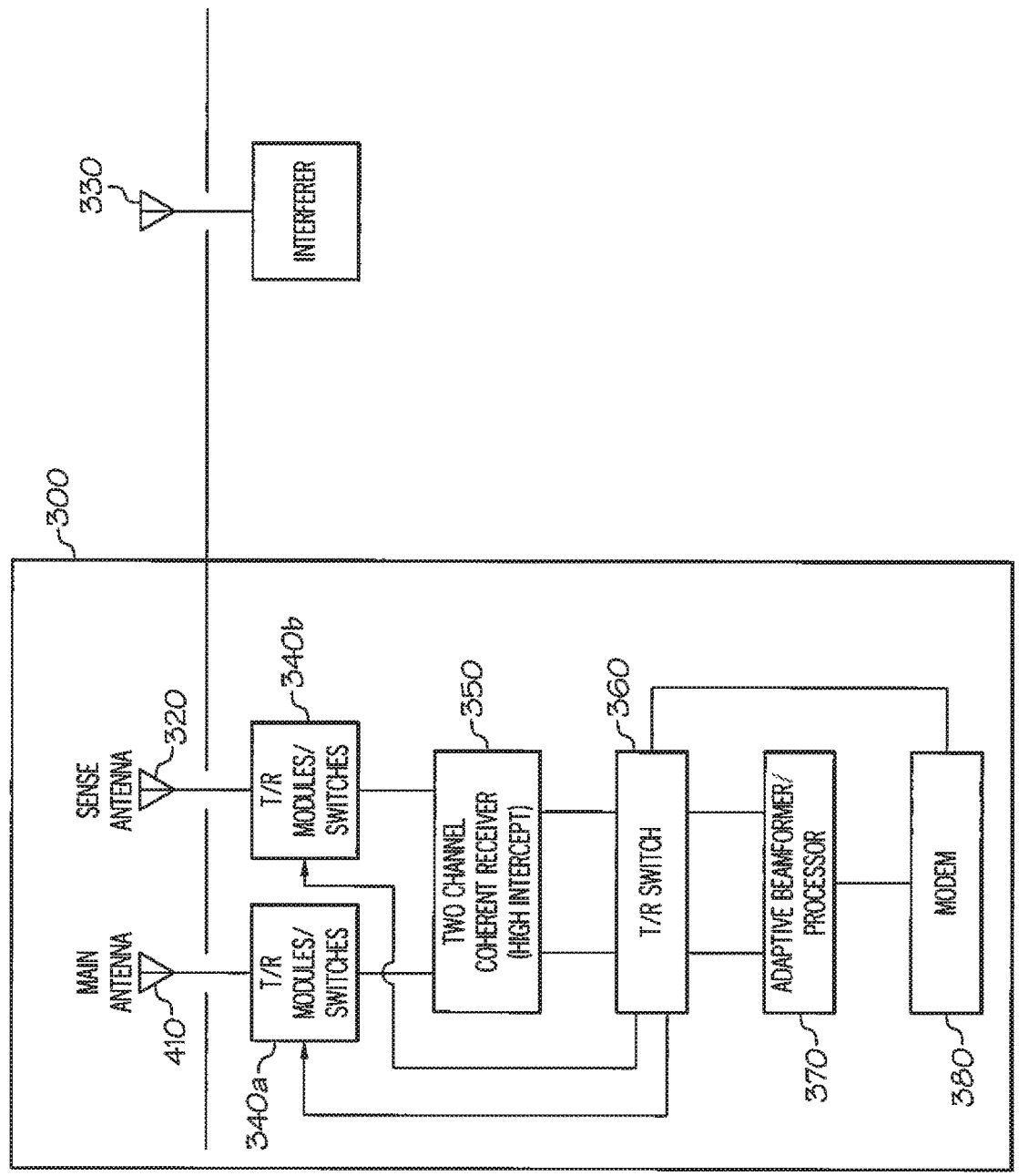

With reference to FIG. 3A, a block diagram of a wireless communication terminal 300 configured to provide interference mitigation is illustrated in accordance with a non-limiting implementation of the present disclosure. A primary transmit/receive antenna 410 is configured to transmit and/or receive desired signals. Sense antenna 320 is configured to sample interfering signal transmissions from interferer terminal 330. In particular implementations, the polarization response of sense antenna 320 is configured to be orthogonal to the polarization response of primary antenna 410. For example, sense antenna 320 may be configured to be LHCP while primary antenna 410 may be configured to be RHCP. In certain implementations, primary antenna 410 and sense antenna 320 may be configured with other orthogonal polarization responses.

As illustrated in FIG. 3A, the outputs of the primary antenna 410 and sense antenna 320 are received by a two-channel coherent high intercept point receiver 350. Two channel coherent high intercept point receiver 350 may be configured to downconvert the RF signals output by the primary antenna 410 and sense antenna 320 to digital baseband (or, in some implementations, another frequency and/or domain).

When wireless communication terminal 300 is operating in a receive mode, T/R switch 360 passes the digital baseband versions of the signals output by the primary antenna 410 and sense antenna 320 to adaptive beamformer/processor 370. Meanwhile, when wireless communication terminal 300 is operating in a transmit mode, T/R switch 360 may control one or more switches (e.g., in T/R module 340a) that allow signals to be transmitted by wireless communications terminal 300 to be passed to the primary antenna 410 and transmitted.

Adaptive beamformer/processor 370 is configured to receive the digital baseband versions of the signals output by the primary antenna 410 and sense antenna 320 and to perform interference mitigation processing on the received signals. For example, in certain implementations, adaptive beamformer/processor 370 is configured to shift the phase of the digital baseband version of the signal output by the sense antenna 320 to be in antiphase with the digital baseband version of the signal output by the primary antenna 410 antenna (e.g., by 180° or substantially 180°) and to combine the phase-shifted digital baseband version of the signal output by the sense antenna 320 with the digital baseband version of the signal output by the primary antenna 410 to generate an interference mitigated signal. After the adaptive beamformer/processor 370 completes the interference mitigation processing, the adaptive beamformer/processor 370 transmits the interference mitigated signal to modem 380.

In some implementations, adaptive beamformer/processor 370 may be configured to steer one or more beams of primary antenna 410 (e.g., in directions desirable for communicating with a target satellite and/or to mitigate interference from interferer 330) and/or one or more beams of sense antenna 320 (e.g., to concentrate a main beam of sense antenna 320 on receiving transmissions from interferer 330). For example, adaptive beamformer/processor 370 may be configured to control transmit/receive modules 340a and/or 340b to apply complex weights to signals transmitted and/or received by primary antenna 410 and/or sense antenna 320, respectively. Alternatively, adaptive beamformer/processor 370 itself may include complex weight modules that adaptive beamformer/processor 370 controls to steer one or more beams of primary antenna 410 and/or one or more beams of sense antenna 320.

Figure 6A:
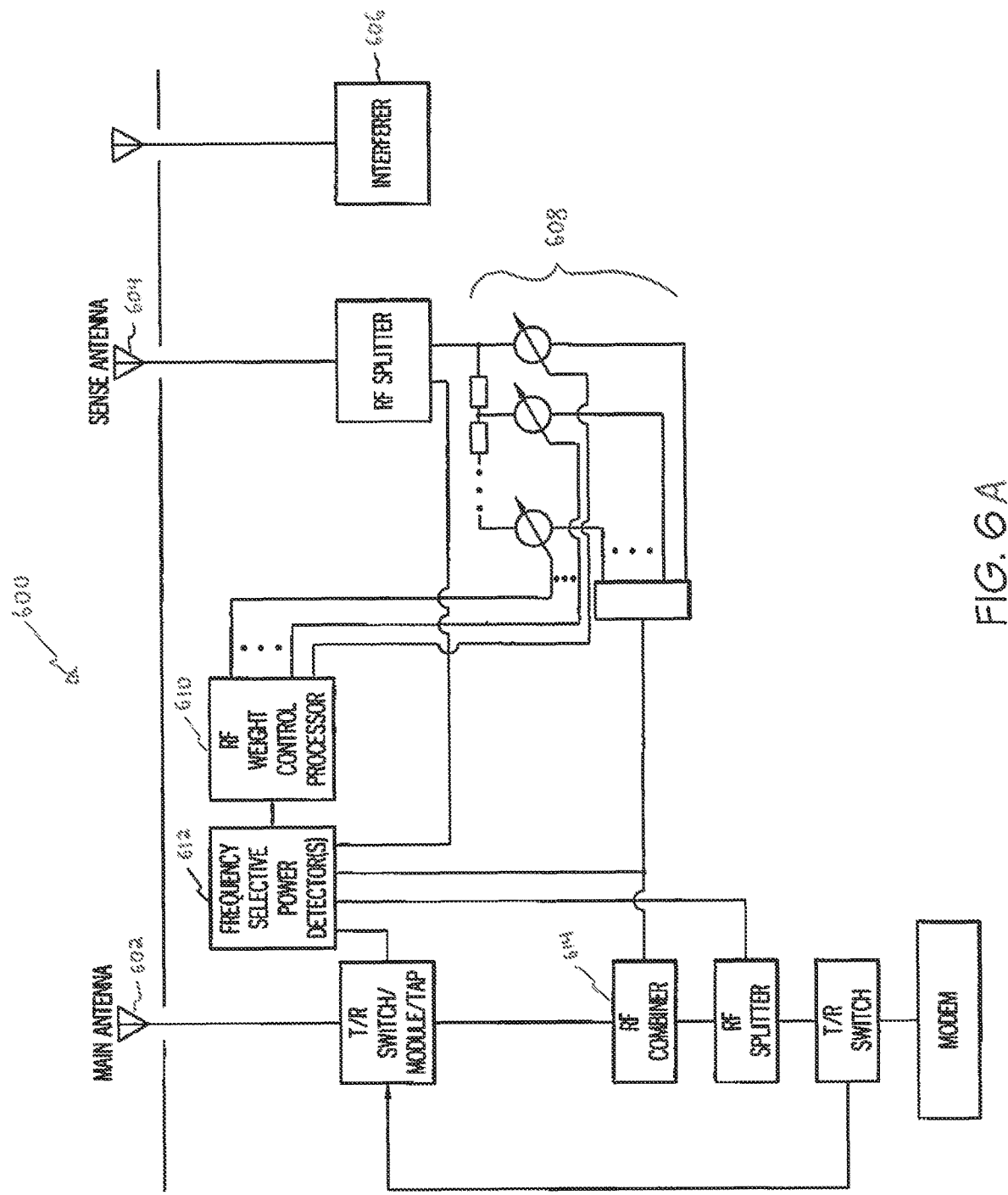
Figure 6B:
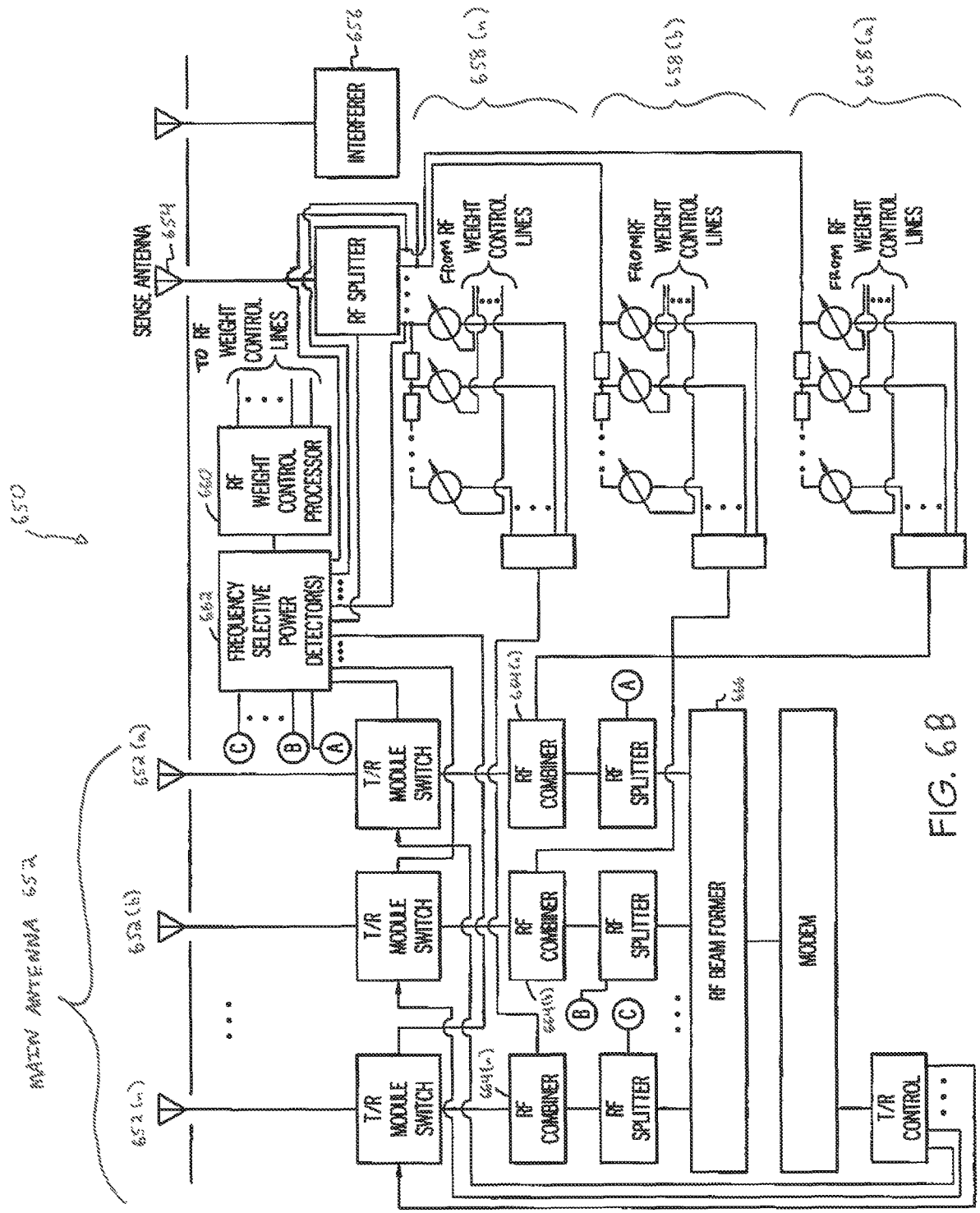
Figure 7A:
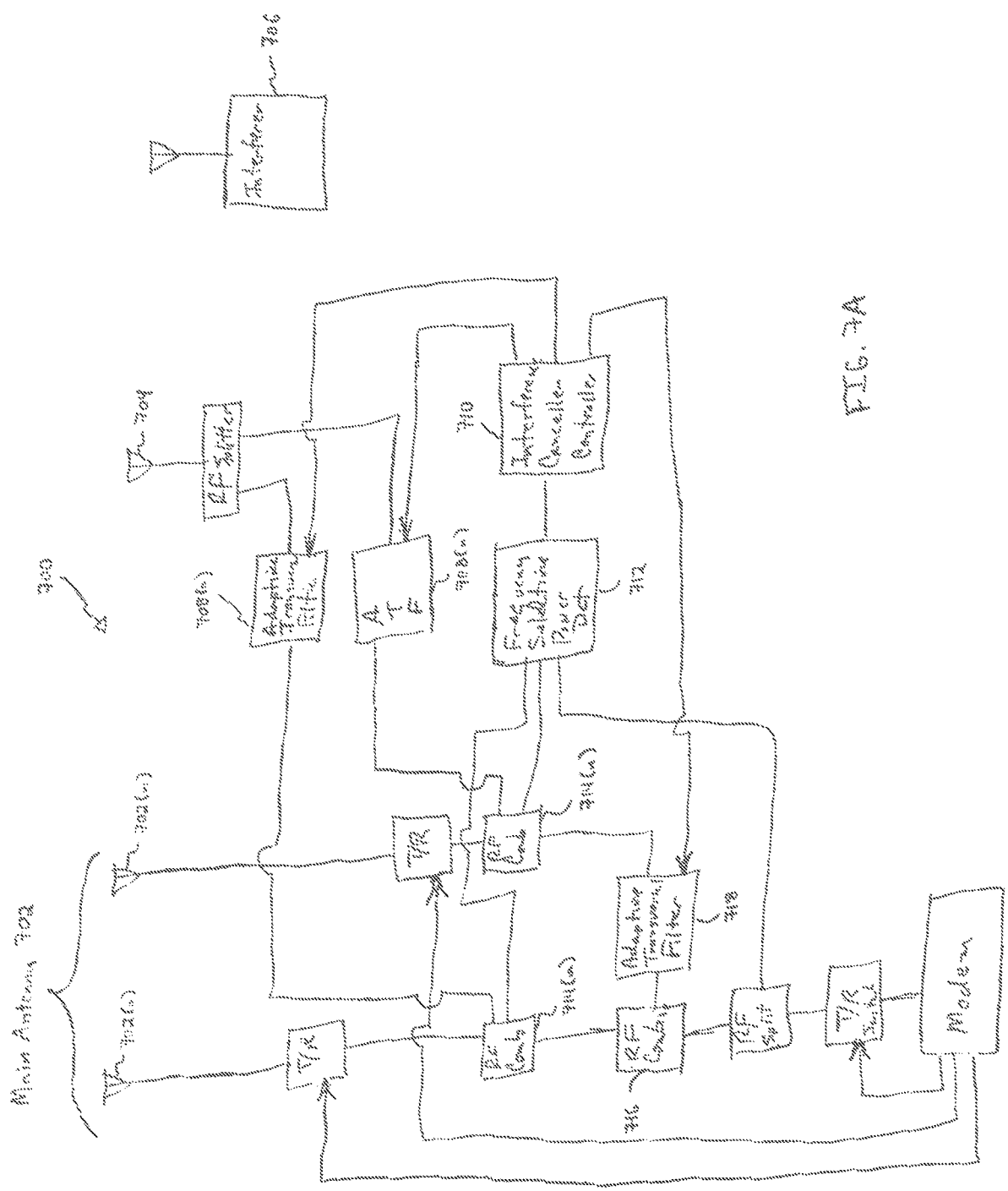

As illustrated in FIG. 3A and discussed above, wireless communication terminal 300 performs the interference mitigation in digital baseband. Such implementations may benefit from the use of high intercept point receivers, such as, for example, the two channel high intercept coherent received 350 illustrated in FIG. 3A. However, high intercept point receivers may be more expensive than other receivers. Consequently, in certain alternative implementations, noise and interference cancellation may be performed in the analog (e.g., RF) domain. In such implementations, high intercept point receivers may not be used. For example, FIGS. 6A-6B and 7A illustrate alternative implementations where interference cancellation is performed in the RF domain and high intercept point receivers are not utilized.

Figure 3B:
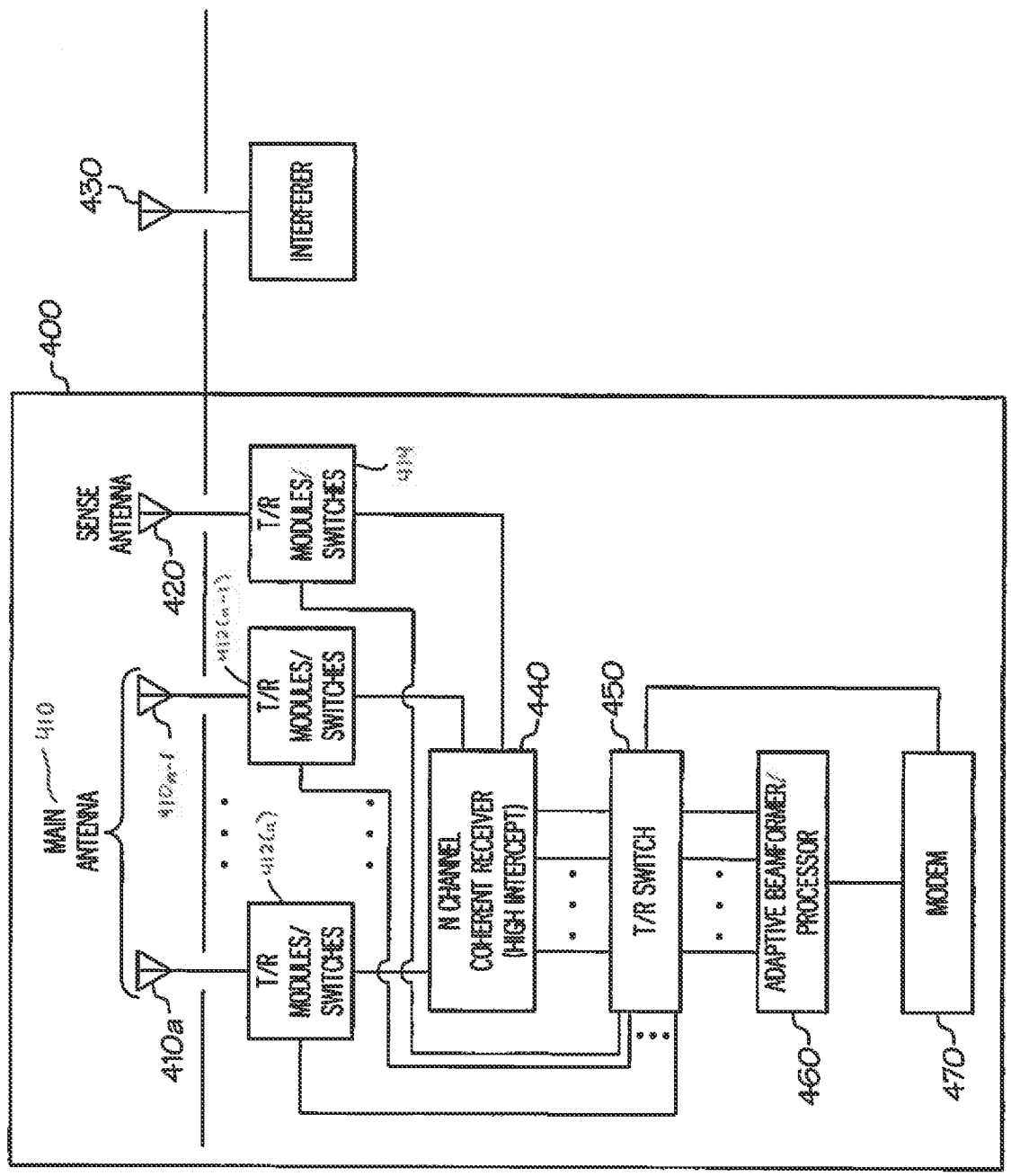

With reference to FIG. 3B, another implementation of a wireless communication terminal 400 is illustrated in accordance with a non-limiting implementation of the present disclosure. Wireless communication terminal 400 may be one example of an implementation of the wireless communication terminal 300 illustrated in FIG. 3A. As illustrated in FIG. 3B, primary transmit/receive antenna 410 is implemented as an n-element array of antenna elements 410a-n. This configuration may enable primary transmit/receive antenna 410 to be a relatively higher gain antenna than an antenna implemented with a single antenna element. In some implementations, primary transmit/receive antenna 410 also may be steerable, for example, to enable one or more beams of the primary transmit/receive antenna 410 to be steered in directions that are favorable for transmitting and/or receiving signals. For example, if wireless communication terminal 400 is configured to communicate with one or more satellites, the primary transmit/receive antenna 410 may be steerable to train a main beam of the primary transmit/receive antenna array 410 in directions favorable for communicating with a target satellite. In some implementations, adaptive beamformer/processor 460 may control complex weights to be applied to signals to be transmitted and/or received by the individual antenna elements 410a-410n-1 in order to steer the primary transmit/receive antenna 410 as desired.

In particular implementations, the polarization response of sense antenna 320 is configured to be orthogonal to the polarization response of primary antenna 410. For example, sense antenna 320 may be configured to be LHCP while primary antenna 410 may be configured to be RHCP.

The primary antenna elements 410a-410n-1 in the primary transmit/receive antenna array 410 each may include an antenna and a transmit/receive module 412(a)-412(n-1). In some implementations, each transmit/receive module 412(a)-412(n-1) may include one or more band pass filters (e.g. for filtering out frequencies outside of the frequency band(s) in which the wireless communication terminal 400 is intended to receive signals), a low noise amplifier (e.g., for amplifying received signals), a transmit power amplifier (e.g., for amplifying signals to be transmitted), radio-frequency switches (e.g., for switching between transmit and receive modes) and/or one or more phase shifters or complex weight modules.

The sense antenna 420 also includes a transmit/receive module 414 that may include one or more filters (e.g., for filtering out frequencies outside of the frequency bands in which the wireless communication terminal 400 is intended to receive signals), a low noise amplifier (e.g., for amplifying received signals), and/or a complex weight module for applying complex weights to received signals (e.g., to shift the amplitude and/or phase of the received signals). In some implementations, sense antenna 420 may not be configured to transmit signals.

In certain implementations, the sense antenna 420 may be configured to sample an interfering signal. For example, the sense antenna 420 may be configured to sample an interfering signal transmitted by another wireless communication terminal located in close physical proximity to wireless communication terminal 400, such as, for example, interfering communication terminal 430. In some implementations, sense antenna 420 may be configured to be steered, or to otherwise have a spatial response, to be relatively responsive to signals transmitted by interfering communication terminal 430 while being relatively unresponsive to other signals.

The outputs of the primary antenna elements 410a-410n-1 and sense antenna 420 are received by a multi-channel (e.g., n-channel) coherent high intercept point receiver 440. Receiver 440 may be configured to downconvert the RF signals output by the primary antenna elements 410a-410n-1 and sense antenna 420 to digital baseband (or, in some implementations, another frequency and/or domain).

When wireless communication terminal 400 is operating in a receive mode, T/R switch 450 passes the digital baseband versions of the signals output by the primary antenna elements 410a-410n-1 and sense antenna 420 to adaptive beamformer/processor 460. Meanwhile, when wireless communication terminal 400 is operating in a transmit mode, T/R switch 450 may control one or more switches (e.g., in transmit/receive modules 412(a)-412(n-1)) that allow signals to be transmitted by wireless communications terminal 400 to be passed to the primary antenna elements 410a-410n-1 and transmitted.

Adaptive beamformer/processor 460 is configured to receive the digital baseband versions of the signals output by the primary antenna elements 410a-410n-1 and sense antenna 320 and to perform interference mitigation processing on the received signals. For example, in certain implementations, adaptive beamformer/processor 460 is configured to shift the phase of the digital baseband version of the signal output by the sense antenna 420 to be in antiphase with the digital baseband versions of the signals output by the primary antenna elements 410a-410n-1 (e.g., by 180° or substantially 180°) and to combine the phase-shifted digital baseband version of the signal output by the sense antenna 420 with the digital baseband versions of the signals output by the primary antenna elements 410a-410n-1 to generate an interference mitigated signal. After the adaptive beamformer/processor 460 completes the interference mitigation processing, the adaptive beamformer/processor 460 transmits the interference mitigated signal to modem 470.

In some implementations, adaptive beamformer/processor 460 may be configured to steer one or more beams of primary antenna 410 (e.g., in directions desirable for communicating with a target satellite and/or to mitigate interference from interfering communications 330) and/or one or more beams of sense antenna 320 (e.g., to concentrate a main beam of sense antenna 320 on receiving transmissions from interfering communication terminal 430). For example, adaptive beamformer/processor 460 may be configured to control transmit/receive modules 412(a)-412(n−1) and/or 414 to apply complex weights to signals transmitted and/or received by primary antenna 410 and/or sense antenna 320, respectively. Alternatively, adaptive beamformer/processor 460 itself may include phase shifters or complex weight modules that adaptive beamformer/processor 460 controls to steer one or more beams of primary antenna 410 and/or one or more beams of sense antenna 320.

Figure 4:
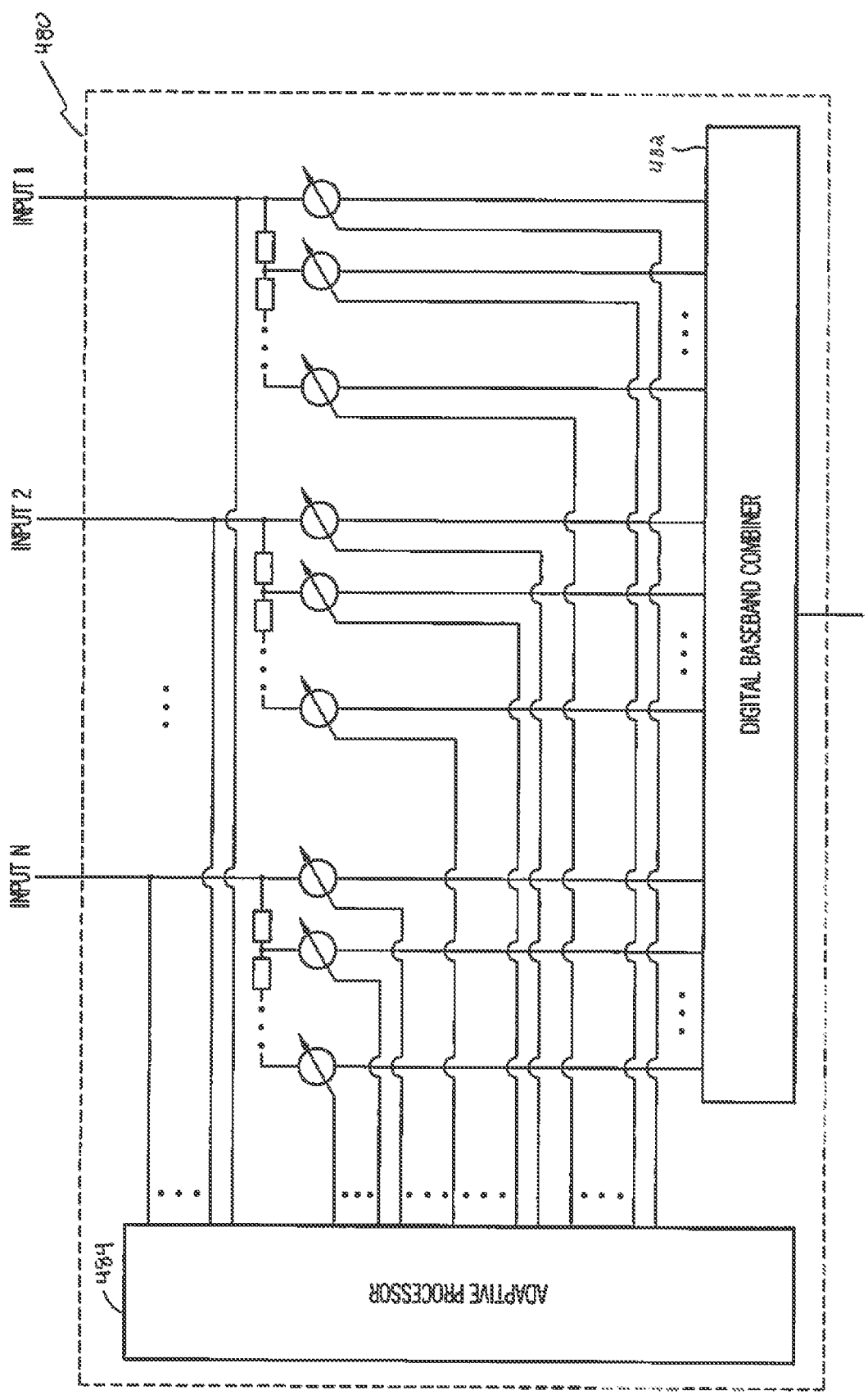
FIG. 4 is a block diagram of an adaptive beamformer/processor in accordance with a non-limiting implementation of the present disclosure.

FIG. 4 illustrates aspects of one example implementation of an adaptive beamformer/processor 480, such as, for example, adaptive beamformer/processor 370 of FIG. 3A or adaptive beamformer/processor 460 of FIG. 3B. As illustrated in FIG. 4, adaptive beamformer/processor 480 includes a digital baseband combiner 482 and an adaptive processor 484. In addition, adaptive beamformer/processor 480 includes an m-tap adaptive transversal filter for each of the n receiver channels. As such, adaptive beamformer/processor 480 may process the signal on each of the n receiver channels with an m-tap adaptive transversal filter, for example to mitigate noise and/or interference over a wide bandwidth. Among other features, adaptive processor 484 may be configured to determine and cause the appropriate weights to be applied by the different taps of each of the adaptive transversal filters. Digital baseband combiner 482, meanwhile, may be configured to combine the processed signals from each of the n receiver channels at digital baseband in order to generate an interference mitigated signal. For example, in some implementations, digital baseband combiner 482 may be configured to subtract (or combine in antiphase) the digital baseband version(s) of the signal received by sense antenna 420 from the digital baseband version(s) of the signal received by the primary antenna 410.

Figure 5:
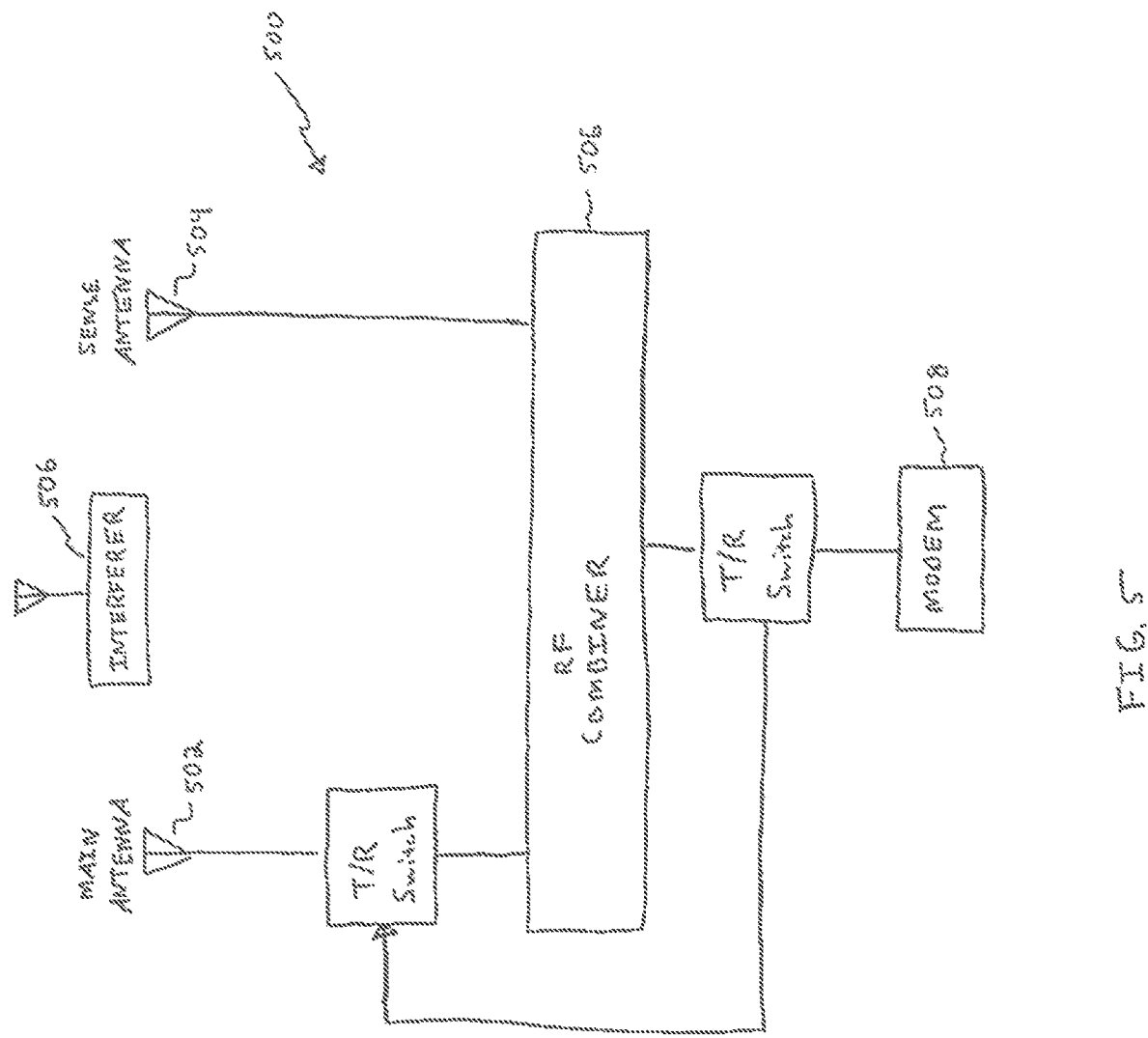

FIG. 5 illustrates one example implementation of a wireless terminal 500 according to the teachings of this disclosure, for example, for use on an aircraft. As illustrated in FIG. 5, the wireless terminal 500 includes a main antenna 502 and a sense antenna 504. In addition, the main antenna 502 and the sense antenna 504 are in close physical proximity to an interfering wireless communications terminal 506. The main antenna and the sense antenna may be positioned to be equidistant from the interfering wireless communications terminal 506 so that the interfering signal transmitted by the interfering wireless communications terminal 506 arrives at the main antenna 502 and the sense antenna 504 with the same phase. In some implementations, the polarizations of the main antenna 502 and the sense antenna 504 may be orthogonal. For example, the desired signal and correspondingly the main antenna 502 may be right hand circularly polarized and the sense antenna 504 may be left hand circularly polarized (or vice versa). Therefore, as described above, the sense antenna 504 may respond to the interfering signal but not the desired signal. As illustrated in FIG. 5, the signal received by the main antenna 502 and the signal sampled by the sense antenna 504 may be fed into a radio frequency ("RF") combiner 506, which may shift the phase of the signal received by the sense antenna 504 by substantially 180 degrees or as otherwise appropriate so that the signals received by the main antenna 502 and the sense antenna 504 are substantially in antiphase (e.g., by applying a complex weight to the signal received by the sense antenna 504) and then combine the phase-shifted signal from the signal received by the main antenna to mitigate the interference caused by signals transmitted by the interfering wireless communications terminal. Thereafter, the resultant, interference mitigated signal may be transmitted by the RF combiner 506 to modem 508.

FIGS. 6A and 6B are block diagrams of examples of wireless communication terminals 600 and 650, respectively, that are configured to provide interference mitigation in the RF domain in accordance with non-limiting implementations of the present disclosure.

Referring first to FIG. 6A, wireless communication terminal 600 includes a primary transmit/receive antenna 602 configured to transmit and/or receive desired signals and a sense antenna 604 configured to sample interfering signal transmissions from interferer terminal 606. In particular implementations, the polarization response of sense antenna 604 is configured to be orthogonal to the polarization response of primary antenna 602. For example, sense antenna 604 may be configured to be LHCP while the desired signal and correspondingly primary antenna 602 may be configured to be RHCP (or vice versa).

As illustrated in FIG. 6A, wireless communication terminal 600 includes an m-tap adaptive transversal filter 608 configured to process signals received by sense antenna 604. In some implementations, the weights applied by the individual taps of adaptive transversal filter 608 may be controlled by an RF weight control processor 610, for example, based on feedback received from frequency selective power detector(s) 612, which may detect power in one or more of the signal received by main antenna 602, the signal received by sense antenna 604, the signal output by the adaptive transversal filter 608, and the ultimate interference mitigated signal.

After the signal received by sense antenna 604 is processed by the adaptive transversal filter 608, the processed signal received by the sense antenna 604 is combined in antiphase with (or subtracted from) the signal received by the main antenna 602 by RF combiner 614, which outputs an interference mitigated signal. Thus, in contrast to the wireless communication terminals 300 and 400 illustrated in FIGS. 3A and 3B, where the interference mitigation is performed in digital baseband, as illustrated in FIG. 6A, the interference mitigation is performed in RF.

Referring now to FIG. 6B, wireless communication terminal 650 may be one example of an implementation of the wireless communication terminal 600 illustrated in FIG. 6A having a relatively higher gain main antenna. As illustrated in FIG. 6B, wireless communication terminal 650 includes a primary transmit/receive antenna 652, implemented as an n-element array of antenna elements 652(a)-652(n), configured to transmit and/or receive desired signals and a sense antenna 654 configured to sample interfering signal transmissions from interferer terminal 656. In particular implementations, the polarization response of sense antenna 654 is configured to be orthogonal to the polarization response of primary antenna 652. For example, sense antenna 654 may be configured to be LHCP while the desired signal and correspondingly primary antenna 652 may be configured to be RHCP (or vice versa).

As illustrated in FIG. 6B, wireless communication terminal 650 includes a corresponding m-tap adaptive transversal filter 658(a)-658(n) for each of the n antenna elements of primary antenna 652. Adaptive transversal filters 658(a)-658(n) are configured to process signals received by sense antenna 654. In some implementations, the weights applied by the individual taps of the adaptive transversal filters 658(a)-658(n) may be controlled by an RF weight control processor 660, for example, based on feedback received from frequency selective power detector(s) 662, which may detect power in one or more of the signals received by the main antenna elements 652(a)-652(n), the signal received by sense antenna 654, and the preliminary interference mitigated signals.

After the signal received by sense antenna 654 is processed by the adaptive transversal filters 658(a)-658(n), the processed signals output by the adaptive transversal filters 658(a)-658(n) are combined at RF in antiphase with (or subtracted from) the corresponding signals received by main antenna elements 652(a)-652(n) by RF combiners 664(a)-664(n), which generate preliminary interference mitigated signals. These preliminary interference mitigated signals then are input to RF beam former 666, which processes them (e.g., by applying complex weights to effectively steer one or more beams of primary antenna 652 in a desired manner) and combines them into an interference mitigated signal. Thus, as with the wireless communication terminal 600 illustrated in FIG. 6A the interference mitigation performed by wireless communication terminal 650 is performed in RF.

With reference to FIG. 7A, a block diagram of a wireless communication terminal 700 configured to provide interference mitigation is illustrated in accordance with a non-limiting implementation of the present disclosure. As illustrated in FIG. 7A, wireless communication terminal 700 includes a primary antenna 702, implemented as an n-element array of antenna elements 702(a)-702(n), configured to transmit and/or receive desired signals and a sense antenna 704 configured to sample interfering signal transmissions from interferer terminal 706. In particular implementations, the polarization response of sense antenna 704 is configured to be orthogonal to the polarization response of primary antenna 702. For example, sense antenna 704 may be configured to be LHCP while the desired signal and correspondingly primary antenna 702 may be configured to be RHCP (or vice versa).

Wireless communication terminal 700 is similar to wireless communication terminal 650 illustrated in FIG. 6B. However, whereas primary antenna 652 of wireless communication terminal 650 illustrated in FIG. 6B may be an adaptive antenna steerable in a variety of different manners and/or directions, as illustrated in FIG. 7A, wireless communication terminal 700 may include a primary antenna 702 implemented as a switched beam antenna.

As illustrated in FIG. 7A, wireless communication terminal 700 includes a corresponding adaptive transversal filter 708(a)-708(n) for each of the n antenna elements of primary antenna 702. Adaptive transversal filters 708(a)-708(n) are configured to process signals received by sense antenna 704. In some implementations, adaptive transversal filters 708(a)-708(n) may be controlled by an interference canceller controller 710, for example, based on feedback received from frequency selective power detector(s) 712.

After the signal received by sense antenna 704 is processed by the adaptive transversal filters 708(a)-708(n), the processed signals output by the adaptive transversal filters 708(a)-708(n) are combined at RF in antiphase with (or subtracted from) the corresponding signals received by main antenna elements 702(a)-702(n) by RF combiners 714(a)-714(n), which generate preliminary interference mitigated signals. These preliminary interference mitigated signals then are input to RF combiner 716, which combines them into an interference mitigated signal. In some implementations, individual preliminary interference mitigated signals may be processed by additional adaptive transversal filters (e.g., adaptive transversal filter 718) before being input to RF combiner 716.

With reference to FIG. 7B, a block diagram of an adaptive transversal filter 708 illustrates one example of adaptive transversal filters 708(a)-708(n) of wireless communication terminal 700 of FIG. 7A in accordance with a non-limiting implementation of the present disclosure.

In some implementations, a hybrid approach to interference mitigation involving interference mitigation at both RF and digital baseband may be employed. For example, with reference to FIGS. 8A, 8B, and 9, block diagrams of wireless communication terminals 800, 850, and 900, respectively, configured to provide interference mitigation at both RF and digital baseband are illustrated in accordance with non-limiting implementations of the present disclosure.

Referring first to FIG. 8A, wireless communication terminal 800 includes a primary transmit/receive antenna 802 having two antenna elements 802(a) and 802(b) configured to transmit and/or receive desired signals and a sense antenna 804 configured to sample interfering signal transmissions from interferer terminal 806. In particular implementations, the polarization response of sense antenna 804 is configured to be orthogonal to the polarization response of primary antenna 802. For example, sense antenna 804 may be configured to be LHCP while the desired signal and correspondingly primary antenna 802 may be configured to be RHCP (or vice versa).

Wireless communication terminal 800 is configured to perform interference mitigation at RF similarly as wireless communication terminals 700 and 750 of FIGS. 6A and 6B, respectively. Namely, processed signals received by sense antenna 804 are combined in antiphase with (or subtracted from) signals received by primary antenna elements 802(a) and 802(b) by RF combiners 808(a) and 808(b) to generate preliminary interference mitigated signals. However, wireless communication terminal 800 also is configured to perform additional interference mitigation at digital baseband as well. As illustrated in FIG. 8A, the preliminary interference mitigated signals are input to 2-channel coherent receiver 810, where they are downconverted to digital baseband (or, in some implementations, another frequency or domain). The resulting digital baseband signals then are input to adaptive beamformer and processor 812, which combines the digital baseband signals and performs additional interference mitigation at digital baseband, for example, through filtering, applying complex weights, and/or beamsteering/beamforming to generate an interference mitigated signal. This hybrid approach to interference mitigation may reduce the benefit of high intercept point receivers to the wireless communication terminals 300 and 400 of FIGS. 3A and 3B, respectively, potentially allowing for the use of less expensive or less complicated receivers.

Figure 8B:
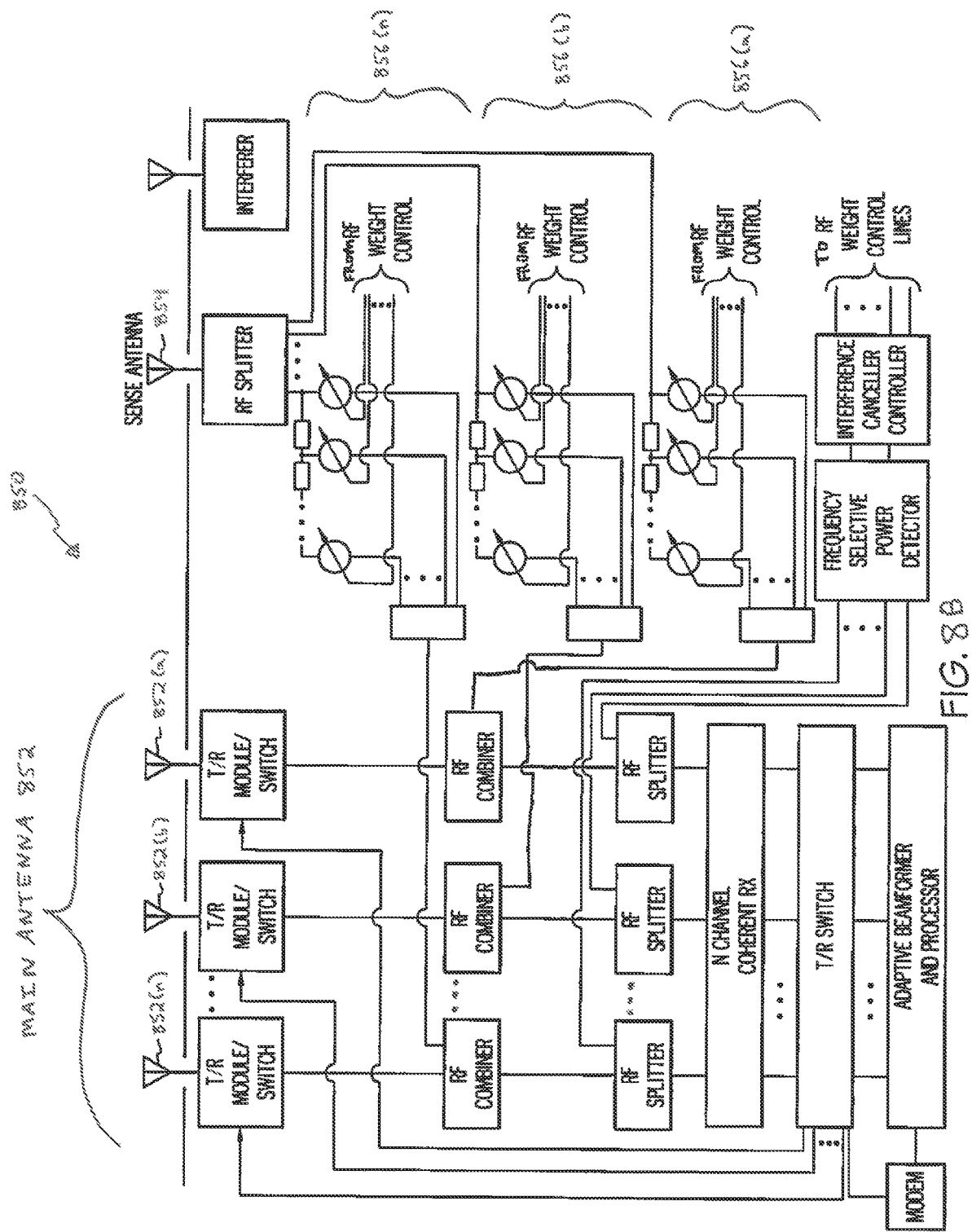

Referring now to FIG. 8B, wireless communication terminal 850 is similar to wireless communication terminal 800 of FIG. 8A, except primary antenna 852 is implemented as an n-element array of antenna elements 852(a)-852(n) and, correspondingly, wireless communication terminal 850 has n adaptive transversal filters 856(a)-856(n) for processing signals received by sense antenna 854.

Likewise, wireless communication terminal 900 illustrated in FIG. 9 is similar to wireless communication terminal 850 of FIG. 8B, except that the primary antenna 902 of wireless communications terminal 900 is implemented as a switched beam antenna instead of as an adaptive array antenna.

Application of the teachings of the present disclosure may enable the simultaneous operation of two or more wireless communication terminals located in close physical proximity to one another, such as, for example, when mounted on the fuselage of a single aircraft or on the deck of a ship, even if the wireless communication terminals transmit and/or receive using similar, adjacent, neighboring, and/or overlapping frequencies. For example, application of the teachings of the present disclosure may enable an IRIDIUM® satellite communication terminal to be operated in the presence of a nearby active INMARSAT® satellite communication terminal.

Aspects of the present disclosure may be implemented entirely in hardware, entirely in software (including firmware, resident software, micro-code, etc.) or in combinations of software and hardware that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of such a computer-readable storage medium include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF signals, etc., or any suitable combination of the foregoing.

Computer program code for carrying out operations for aspects of the present disclosure may be written in any combination of one or more programming languages, including object oriented programming languages, dynamic programming languages, and/or procedural programming languages.

The flowchart and block diagrams in the figures illustrate examples of the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The interference mitigation techniques described herein may be employed in a wide variety of different contexts to enable concurrent operation of two or more co-located wireless communication terminals. For example, the interference mitigation techniques described herein may be employed to enable concurrent operation of two satellite communication terminals mounted within a short distance of one another on a ship or aircraft. Similarly, the interference mitigation techniques described herein may be employed to enable concurrent operation of two terminals (e.g., transceivers) on a single satellite.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to explain the principles of the disclosure and the practical application, and to enable others of ordinary skill in the art to understand the disclosure with various modifications as are suited to the particular use contemplated.

What is claimed is:

1. A wireless communication terminal comprising:
a sense antenna module configured to sample an interference signal from a co-located interfering communication system terminal, the co-located interfering communication system terminal comprising a transmitting antenna transmitting the interference signal, wherein the sense antenna module has a first polarization type;
at least one primary antenna module configured to receive a desired signal, the at least one primary antenna module having a second polarization type, substantially orthogonal to the first polarization type of the sense antenna module, and the at least one primary antenna module being mounted to a same conductive boundary as the sense antenna module and the co-located interfering communication system terminal; and
at least one signal combiner configured to receive output from the sense antenna module and output from the primary antenna module, and configured to mitigate interference with the desired signal by:
shifting the phase of the output from the sense antenna module by substantially 180 degrees, and
combining the phase-shifted output from the sense antenna module with the output of the primary antenna module to produce an interference mitigated signal.

2. The wireless communication terminal of claim 1, wherein the at least one signal combiner is implemented in a digital baseband domain.

3. The wireless communication terminal of claim 2, wherein the phase-shifted output from the sense antenna module comprises a digital signal, and wherein the at least one signal combiner is configured to combine the phase-shifted output from the sense antenna module with the output from the primary antenna module in the digital baseband domain.

4. The wireless communication terminal of claim 3 further comprising at least one high intercept point coherent receiver to convert output from the primary antenna module from RF to digital baseband.

5. The wireless communication terminal of claim 4 wherein the high intercept point coherent receiver comprises a two-channel, high intercept point coherent receiver to convert output from the primary antenna module from RF to digital baseband and to convert output from the sense antenna module from RF to digital baseband.

6. The wireless communication terminal of claim 1, wherein the at least one signal combiner is implemented in an RF domain.

7. The wireless communication terminal of claim 6, wherein the phase-shifted output from the sense antenna module comprises an RF signal, and wherein the at least one signal combiner is configured to combine the RF phase-shifted output from the sense antenna module with the output from the primary antenna module in the RF domain.

8. The wireless communication terminal of claim 1, wherein the at least one signal combiner includes at least one adaptive transversal filter.

9. The wireless communication terminal of claim 1, wherein the at least one signal combiner comprises:
at least one RF signal combiner implemented in an RF domain; and
at least one digital signal combiner implemented in a digital baseband domain.

10. The wireless communication terminal of claim 9, wherein the wireless communication terminal comprises a low intercept point coherent receiver to convert output from the at least one RF signal combiner implemented in the RF domain to digital baseband.

11. The wireless communication terminal of claim 9, wherein:
the at least one RF signal combiner implemented in the RF domain is configured to:
receive output from the sense antenna module and output from the primary antenna module, and
mitigate interference with the desired signal by shifting the phase of the output from the sense antenna module by substantially 180 degrees and combining the phase-shifted output from the sense antenna module with the output of the primary antenna module to produce an interference mitigated signal; and
the at least one digital signal combiner implemented in the digital baseband domain is configured to:
receive an input signal including the desired signal and a digital representation of the interference mitigated signal, and
process the input signal and the digital representation of the interference mitigated signal at digital baseband to generate a further interference mitigated signal.

12. The wireless communication terminal of claim 1, wherein the primary antenna module comprises an omnidirectional antenna, and wherein the transmitting antenna and the primary antenna are transmitting RF signals in at least one of adjacent frequency bands and overlapping frequency bands.

13. The wireless communication terminal of claim 1, wherein the wireless communication terminal is configured to be co-located within 10 meters of the interfering communication system.

14. The wireless communication terminal of claim 1, wherein the wireless communication terminal comprises an IRIDIUM system, and wherein the co-located interfering communication system terminal comprises an INMARSAT system.

15. The wireless communication terminal of claim 1, wherein the at least one primary antenna module comprises a primary antenna array including multiple antenna elements.

16. A method for processing a desired signal by a wireless communication terminal comprising:
receiving a main signal with at least one primary antenna, the main signal including interference from a proximally located interfering wireless communication terminal transmitting an interference signal, the at least one primary antenna having a first polarization type;
sampling the interference signal from the interfering wireless communication terminal with a sense antenna, the sense antenna having a second polarization type, substantially orthogonal to the first polarization type of the at least one primary antenna, wherein the primary antenna is mounted to a same conductive boundary as the sense antenna and the interfering wireless communication terminal;
shifting the phase of the sampled interference signal by substantially 180 degrees; and
combining the phase-shifted, sampled interference signal with the main signal to produce an interference mitigated signal.

17. The method of claim 16, wherein the phase shifting and the combining are performed in a digital baseband domain.

18. The method of claim 16, wherein the phase shifting and the combining are performed in an RF domain.

19. A satellite communication terminal comprising:
a sense antenna oriented towards a co-located interfering communication system terminal and configured to sample an interference signal from the interfering communication system terminal, the co-located interfering communication system terminal comprising a transmitting antenna transmitting the interference signal, wherein the sense antenna has a first circular polarization type;
a primary antenna array including a first number of primary antenna elements, the primary antenna array being configured to receive a desired signal, each of the primary antenna elements having a second circular polarization type, orthogonal to the first circular polarization type of the sense antenna, wherein the primary antenna array is mounted to a same conductive boundary as the sense antenna and the co-located interfering communication system terminal; and
at least one signal combiner configured to receive output of the sense antenna and output of the primary antenna array, and configured to mitigate interference with the desired signal by:
shifting the phase of the output of the sense antenna by substantially 180 degrees; and
combining the phase-shifted output of the sense antenna with the output of the primary antenna array to produce an interference mitigated signal.

20. The satellite communication terminal of claim 19 wherein:
the sense antenna is left hand circularly polarized; and
each of the primary antenna elements is right hand circularly polarized.

* * * * *